Patented July 3, 1928.

1,676,069

UNITED STATES PATENT OFFICE.

NILS OLOF BACKLUND, OF STOCKHOLM, SWEDEN, ASSIGNOR TO BERGEDORFER EISEN-WERK AKTIENGESELLSCHAFT, OF SANDE, NEAR BERGEDORF-HAMBURG, GERMANY, A CORPORATION OF GERMANY.

SEPARATING FROM FLUID HYDROCARBONS OTHER HYDROCARBONS WHICH PRECIPITATE AT LOW TEMPERATURE.

No Drawing. Application filed January 28, 1927, Serial No. 164,377, and in Germany August 16, 1926.

In the treatment of fluid hydrocarbons, such as mineral oil, it is often necessary, at some stage of their treatment, to remove therefrom such hydrocarbons as will, with sufficient cooling, precipitate in solid form. For example, in the production of lubricating oils from crude mineral oil, it is necessary, at some stage of the process, to remove the paraffins, in order to obtain lubricating oils with a low cold test.

A common way to remove such paraffins from the fluid hydrocarbons is to cool the mixture to such a temperature that the paraffins to be removed precipitate in solid form and then to remove the paraffins by means of a filter press. To make such filtration practicable, it is necessary that part of the paraffins, during the distillation, shall be transformed, by superheating, into a crystalline state. In such distillation, and due to the superheating, a part of the paraffins and the high viscous lubricating oils will decompose, with the result that the yield of lubricating oils, as well as of the valuable paraffins, is reduced.

The peculiar difficulties involved in separation by means of filtration have been largely overcome by later developed methods of centrifugal separation. Such methods, however, involve new difficulties. Taking, as an example, the production of lubricating oils: the crude oils contain paraffins whose specific gravity in a solid state is between .83 and .92; while the fluid hydrocarbons from which the paraffins are to be removed have generally a specific gravity which lies within the range specified. It is evident that centrifugation of the cooled mixture can effect only a partial removal of the paraffins. Further, the cooling of the mixture objectionably increases the viscosity of the fluid hydrocarbons.

In order to effect a more nearly complete separation by means of centrifuging, it is customary to add to the mixture a liquid, preferably a light hydrocarbon, such as gasoline, having a relatively low specific gravity and with which the fluid hydrocarbons are adapted to form a solution. If an adequate quantity of such solvent or diluent liquid be added, the difference betwen the specific gravities of the diluted fluid hydrocarbons and the paraffins is sufficient to permit of centrifugal separation. In this way, for example, the residues from the distillation of Pennsylvania crude oils are treated. In these residues the paraffins are in an amorphous state, and, during centrifugation, collect at the periphery of the bowl, whence they continuously outflow. The paraffinous material that is thus removed consists of paraffins suspended in a certain proportion of fluid hydrocarbons. If these fluid hydrocarbons, which act as a diluent, are distilled off, a product similar to vaseline is obtained.

However, the difference between the specific gravities of the gasoline and the light hydrocarbons of the mixture to be separated is not great, and consequently a relatively large proportion of gasoline, amounting in weight sometimes to two and a half times the weight of the residues to be treated, must be added. This involves expensive installations and high running costs. Among the paraffins are always some that at sufficiently low temperature will crystallize. Further, the cooling must take place slowly and with careful stirring, which procedure is further promotive of the formation of large crystals. The resultant paraffin mixture—amorphous and crystalline paraffins—is very unhomogeneous. In the centrifugal separating process, the paraffin crystals of highest specific gravity dispose themselves on the bowl wall in such manner that the removal of the amorphous mass becomes very difficult and often impossible.

The object of the present invention is to provide a process by means of which the various enumerated difficulties characterizing the centrifugal treatment are avoided. The process involves the addition to the mixture to be treated of a liquid which, even at low temperature, readily dissolves, or is dissolved in, the fluid hydrocarbons, and which is not a solvent for, or only in a small degree a solvent for, the hydrocarbons (paraffins) to be removed, and which has a higher specific gravity than the heavier hydrocarbons to be separated out and, preferably also, a so very much higher specific gravity that only a comparatively small proportion need be added. To the resultant mixture a low viscosity hydrocarbon may be optionally added for purposes hereinafter explained. The mixture is then centrifugally separated.

In such a centrifugal separation, the paraffins are the light separable constituent. Consequently, the paraffins (carrying also some of the heavier fluid hydrocarbon solution) are displaced toward the central zone of the bowl, whence their continuous removal presents no serious difficulties. The solution of fluid hydrocarbons and solvent liquid, which travels toward the bowl wall, has so high a degree of fluidity that it discharges very freely.

Care must be taken, however, that the viscosity of the mixture be maintained sufficiently low. In case the viscosity be not sufficiently low, there should be added, in addition to the heavy solvent, a low viscosity hydrocarbon adapted to form a solution with the fluid hydrocarbons and the heavy solvent. The low viscosity solvent should, like the heavy solvent, fulfill the condition that the viscosity shall not substantially increase with falling temperature. It is also desirable that both diluent solvents shall have low boiling points.

It is of little or no importance that the added solvents may be capable, at a high temperature, of forming a solution with the hydrocarbons to be removed (paraffins) and which at low temperature solidify.

Among suitable high gravity solvents that may be used in practicing the present invention are liquids such as trichlorethylene, tetrachlorethylene, carbontetrachloride, and similar organic compounds. These liquids have specific gravities within about the range 1.47–1.62. Their boiling points are relatively low, varying within the range 77°–121° C. They may be, therefore, readily removed from the separated constituents by distillation at so low a temperature that no decomposition products will be formed.

The process has the following major advantages over the usual centrifugal processes. The paraffins or other hydrocarbons to be removed from the fluid hydrocarbons travel toward the center, instead of toward the periphery, of the bowl, and clogging of the bowl is avoided; and the proportion of added solvent liquid is relatively small, thereby reducing the quantity of liquid to be treated in the steps of cooling, centrifuging and distilling.

The advantages of my improved process may be illustrated by a specific example. Assume a mixture of fluid hydrocarbons having a specific gravity of .86 and paraffins with specific gravities varying from .83 to .92. Let it be further assumed that the proportion of paraffins is so small that they need not be considered in calculating the amount of solvent to be added. If just sufficient gasoline be added to produce a solution of fluid hydrocarbons having a specific gravity of .78 (in order to give a difference of .05 between the specific gravities of the solution of light hydrocarbons and the lightest paraffin), it will be necessary to add 120 kg. gasoline to every 100 kg. paraffinous material. If, however, just sufficient trichlorethylene, having a specific gravity of 1.47, be added to form with the fluid hydrocarbons a solution having a specific gravity of .97 (in order to give a like difference of .05 between the specific gravities of the solution and the heaviest paraffin), it will be necessary to add only 40 kg. trichlorethylene to every 100 kg. paraffinous material. If the paraffine comprises a fairly large proportion of the total mixture, it will be necessary to add less than one-sixth as much trichlorethylene as gasoline.

In most cases the proportion of the heavy solvent added will be sufficient to insure the necessary fluidity of the liquid to be separated. If this is not the case, the proportion of heavy solvent added may be increased. A slight increase in the proportion of heavy solvent added permits, also, the addition, if desired or necessary, of a considerable proportion of light viscous hydrocarbons, such as gasoline, kerosene, benzine, naphtha, or benzol, without narrowing the margin between the specific gravity of the solution and the specific gravity of the heaviest paraffin.

My process, in addition to being applicable to the separation of paraffins from paraffine-containing materials, such as crude oils, distillates and residues, is also applicable to the refining or purification of the paraffin-concentrates. If, for example, in the practice of my process, trichlorethylene be added to the paraffin concentrates, and the mixture then centrifugally separated, the heavy liquid always will carry away a proportion of the fluid hydrocarbons which, at an earlier separation of the paraffin from the fluid hydrocarbons, were carried away with the paraffin. The thus separated heavy liquid, having dissolved in it a small proportion of fluid hydrocarbons, can advantageously be used as a diluent in another separation which will be a preceding separation as applied to a later-treated batch of material. By proceeding in this way, the quantity of liquid required to be cooled and distilled will be relatively small; and it will be necessary to add a pure heavy diluent only for the last separation. In the last operation, the heavy liquid will be contaminated to so small an extent that it can be used as a diluent for the next to last centrifugation. The heavy liquid removed in the last mentioned separation may in turn serve as a diluent for the second to last separation; and so on.

Where, in the claims, I specify trichlorethylene, I mean to include other organic compounds of the same group.

Having now fully described by invention, what I claim and desire to protect by Letters Patent is:

1. The process of separating from fluid hydrocarbons other hydrocarbons which, on cooling, precipitate in solid form, which comprises adding to the mixture a liquid having a specific gravity higher than that of the heaviest of said other hydrocarbons and which is adapted to form a solution with said fluid hydrocarbons and is not adapted to form a solution to a substantial extent with said other hydrocarbons, such liquid being added in a sufficient proportion to form with said fluid hydrocarbons a solution having a specific gravity higher than that of said other hydrocarbons, and centrifugally separating the bulk of said solution from the bulk of said other hydrocarbons.

2. The process of separating fluid hydrocarbons from other hydrocarbons which, on cooling, precipitate in solid form, which comprises adding to the mixture a liquid adapted to form a solution with the said fluid hydrocarbons and not adapted to form a solution to a substantial extent with said other hydrocarbons; the added liquid being one having a specific gravity so much higher than that of the heaviest constituent of the original mixture that it may be, and is, added in minor proportion as compared with the amount of said mixture in order to form, with said fluid hydrocarbons, a solution having a specific gravity higher than that of the heaviest of said other hydrocarbons, subjecting the mixture to centrifugal force and thereby displacing outward the major part of the heavy solution and displacing inward said other hydrocarbons and a minor proportion of the heavy solution, and separately and continuously drawing off said two centrifugally separated constituents.

3. The process of separating from fluid hydrocarbons other hydrocarbons which, on cooling, precipitate in solid form, which comprises adding to the mixture two liquids adapted to form a solution with each other and with said fluid hydrocarbons and not adapted to form a solution to a substantial extent with said other hydrocarbons, one of said liquids being of higher, and the other of said liquids being of lower specific gravity than the specific gravity of said other hydrocarbons, the two liquids being added in such proportion as to form with said fluid hydrocarbons a solution having a specific gravity higher than that of said other hydrocarbons, and centrifugally separating the bulk of the solution of fluid hydrocarbons and solvent liquids from the bulk of said other hydrocarbons.

4. A process in accordance with claim 1 in which, in order to give greater fluidity to the solution, there is also added, before separating, a low viscosity hydrocarbon that is soluble in said solution, said low viscosity hydrocarbon being added in such limited amount that the resultant solution is of higher specific gravity than that of either of the hydrocarbons of the original mixture.

5. A process in accordance with claim 1 in which the heavy liquid added is trichlorethylene.

6. A process in accordance with claim 1 in which the heavy liquid added has a specific gravity within the range 1.47–1.62 and a boiling point within the range 77°–121° C.

7. A process in accordance with claim 1 in which the heavy liquid added has a boiling point of not over about 121° C., and distilling off such liquid from the separated constituents at a temperature not so far above the boiling point of such liquid as to produce substantial amounts of decomposition products.

In testimony of which invention, I have hereunto set my hand, at Stockholm, Sweden, on this 11th day of January, 1927.

NILS OLOF BACKLUND.